Aug. 28, 1951     A. J. HILGERT     2,565,847
THERMOSTATIC DIAPHRAGM HAVING STRAIGHT LINE CHARACTERISTIC
Filed July 18, 1947     2 Sheets-Sheet 1

INVENTOR.
Adolph J. Hilgert
BY
ATTORNEYS.

Aug. 28, 1951 A. J. HILGERT 2,565,847
THERMOSTATIC DIAPHRAGM HAVING STRAIGHT LINE CHARACTERISTIC
Filed July 18, 1947 2 Sheets-Sheet 2
Fig. 7
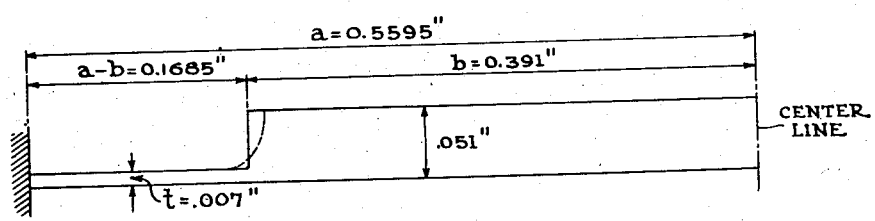
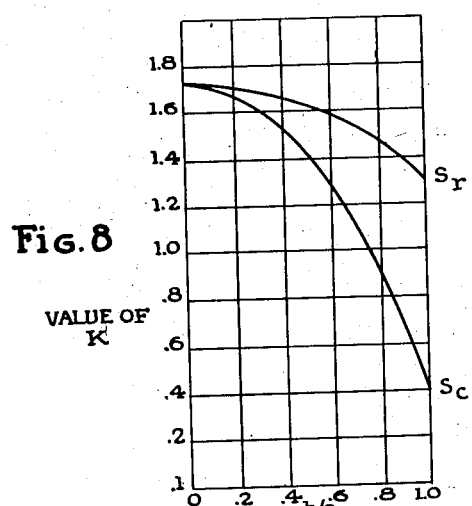
Fig. 8
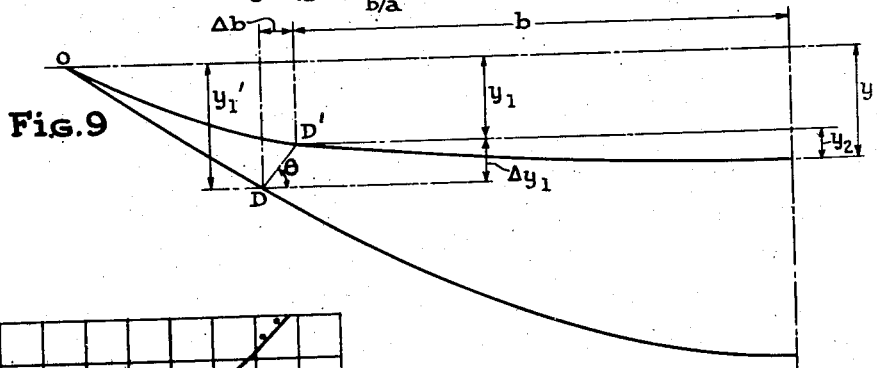
Fig. 9
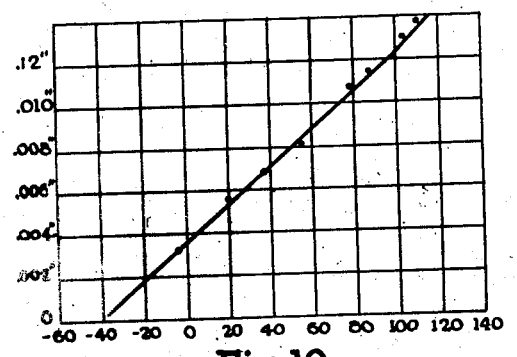
Fig. 10
INVENTOR.
Adolph J. Hilgert
ATTORNEYS.

Patented Aug. 28, 1951

2,565,847

UNITED STATES PATENT OFFICE 2,565,847

THERMOSTATIC DIAPHRAGM HAVING STRAIGHT-LINE CHARACTERISTIC

Adolph J. Hilgert, Milwaukee, Wis., assignor to Johnson Service Company, Milwaukee, Wis., a corporation of Wisconsin Application July 18, 1947, Serial No. 761,759

1 Claim. (Cl. 297—9)

This invention relates to temperature responsive devices, and particularly to a thermostatic cell of the type in which a diaphragm moves in response to changes of saturated vapor pressure induced by changes of temperature.

The prime object of the invention is to produce a unit of this type in which the motion of the diaphragm is substantially proportional to temperature. The invention permits substantial accuracy over a useful temperature range with several saturated vapors commonly used in such devices, for example, propane, butane and ether. "Substantial accuracy" is used to define an error in motion not exceeding 5%, though much better performance is commonly attained. The useful range of vapor pressure lies between 5 p. s. i. and 300 p. s. i. (gage), assuming that the diaphragm is of the material and dimensions hereinafter specified by way of example.

Using propane, good proportional control between minus 38° F. and 137° F. is practicable with such a diaphragm.

The invention stems from the concept that if the diaphragm functions as its own loading spring, its pressure-motion curve might be controlled by design of the diaphragm to match or at least approximate the pressure-temperature curve of the vapor used, thus affording a straight line temperature-motion characteristic.

The result was first attained by trial and error and then analyzed to determine the principles which control success. These principles will be stated hereinafter as a basis for complete disclosure of the invention. As a practical matter, however, intelligent application of the general principles on a trial and error basis offers the shortest and easiest approach now known to the solution of a particular problem.

The invention will now be described by reference to the accompanying drawings, in which:

Figure 7 is a diagram giving dimensions.

Figure 8 is a plot showing the values of certain unit stresses.

Figure 9 is a diagram used in calculations of deflection.

Figure 10 is a diagram indicating the close approach of actual to computed deflections.

Figure 1:
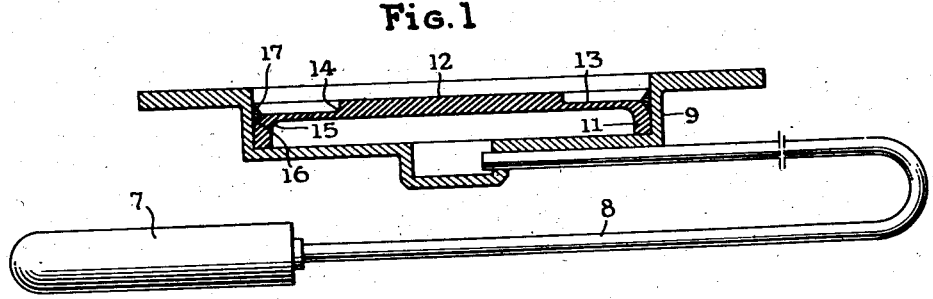
Figure 1 is a view of a thermal bulb and connected diaphragm cell, the latter being drawn in axial section.
Figure 2:
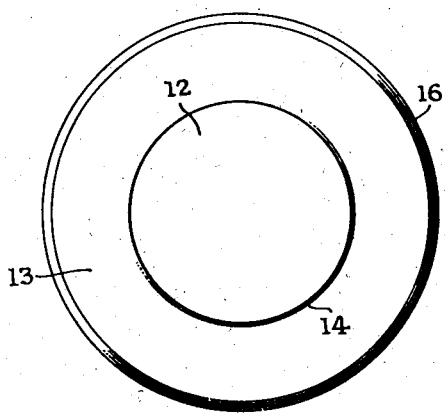
Figure 2 is a face view of the diaphragm.
Figure 3:
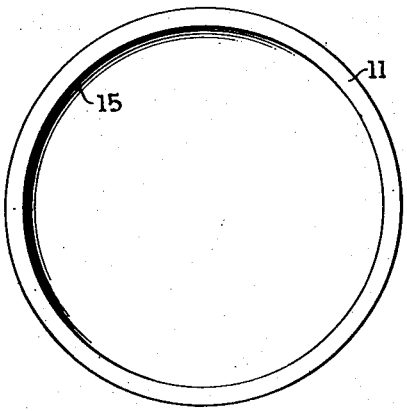
Figure 3 is a view of the rear face of the diaphragm.

Referring to Fig. 1, the volatile liquid (say propane) is contained in a bulb 7 connected by capillary tube 8 with the cup-like housing 9 in which the diaphragm is mounted. Except for the special form of the diaphragm and the absence of a loading spring, the arrangement so far described follows known practice. Other similar arrangements known in the art may be used.

The diaphragm which is conveniently of a copper base alloy, such as bronze, has a stiff marginal flange 11 seated in the circular recess formed in housing 9 to receive it. The diaphragm proper comprises a central circular thick portion 12 and an encircling annular thin portion 13. There is a fillet 14 where the thick and thin portions join, a concave fillet 15 where the thin portion joins flange 11 and a convex fillet 16 which receives solder or other metal 17, forming a fused joint between the flange and housing.

The fillets 14 and 15 are not believed to be strictly necessary but are used to prevent undue localization of strains. When used the diaphragm radius $a$ is measured to the middle of the base of fillet 15 and the radius $b$ of the thick portion is measured to the middle of the base of fillet 14.

Dimensions used in equations hereinafter set forth are indicated on Fig. 7 and for a typical diaphragm having a modulus of elasticity $E=18,500,000$ and Poisson's ratio $\nu=0.30$ were as follows:

$a=0.5595''$
$b=0.391''$
$a-b=0.1685''$
$t=0.007''$
$T=0.051''$

This diaphragm was developed for propane but is reasonably satisfactory with other volatile liquids.

Figure 4:
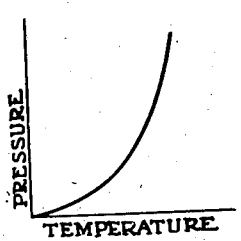
Figure 4 is a plot indicating the general form of a pressure temperature curve for saturated vapor.
Figure 5:
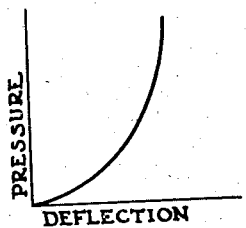
Figure 5 is a plot of the desired pressure deflection curve for the diaphragm.
Figure 6:
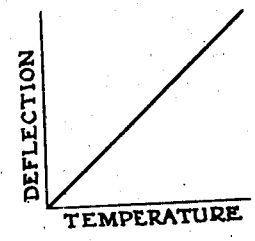
Figure 6 is a plot showing the desired deflection-temperature straight line characteristic.

The reasoning which led to the adoption of this form of diaphragm starts with the pressure-temperature curve sketched in Fig. 4. This is not precise but typical in general form for volatile organic liquids used in such devices. The problem was to find a diaphragm form having a closely similar pressure-displacement curve. See Fig. 5.

A flat circular metal plate fixed and held at its periphery had interesting characteristics when subjected to uniform pressure on one face, but did not meet requirements. To intensify its desirable characteristics a flat thin plate with a stiff thick center was investigated. Here total deflection is due almost wholly to deflection of the thin section.

It was found that for any diameter of diaphragm and for any deflection rate (per degree F.), it is possible, within usable limits, to approximate the desired characteristics. The thin annular portion of the diaphragm affords a high initial deflection rate which can be proportioned to compensate for the slow pressure rise of the vapor in the lower temperature range. Making the thin portion thinner or thicker increases or decreases this initial deflection. The thick section, without resisting high initial deflection, develops an increasing restraining action as deflection increases, thus compensating for the increasing rate of pressure rise in the higher temperature ranges. The larger the diameter of the thick center, the sooner the restraining action is manifested.

In this way two design factors (each independent of the other, to a considerable extent) are afforded and may be coordinated to give the diaphragm the desired deflection-pressure characteristics.

The thick center may or may not be so thick as to be considered practically rigid. Its useful restraining action may be availed of in either case. In the example discussed mathematically its flexure is significant.

In order that the principles of the invention may be fully understood, calculations made on the basis of the successful diaphragm whose dimensions are given above, will now be given by way of example:

Pressure-deflection relationship for annular diaphragm

This discussion shows how the pressure-deflection relationship for an annular diaphragm with a thickened central portion can be calculated. It presents sample computations for a diaphragm of certain dimensions and physical properties, and a computed temperature-deflection graph for this diaphragm and propane vapor.

*Dimensions.*—For purposes of computation the diaphragm was assumed to have the form and dimensions shown in Fig. 7. The effect of the fillet at the junction of the thin and thick portions is conjectural; it was assumed that the stiffness of the actual diaphragm was the same as though the junction of the thin and thick portions occurred at the middle of the base of the fillet, and by an abrupt change in thickness instead of through a fillet.

*Physical properties.*—For the diaphragm material it was assumed that the modulus of elasticity $E = 18{,}500{,}000$ and that Poisson's ratio $$\nu = 1/m = 0.30$$

The temperature-pressure relations for propane were taken from Bulletin No. 1300 of the Fulton Sylphon Co.

*Method of calculations.*—The complete calculations are given in the tabulation on the next page. The formulas and methods used, and the meaning of each column of figures, are explained on subsequent pages.

Tabulated calculations

| (1) | (2) | (3) | (4) | (5) | (6) |
|---|---|---|---|---|---|
| $w_m$ | $w_m^{1/3}$ | $w_m^{2/3}$ | $y_1' = .00327 \times (2)$ | $s_c = 1375 \times (3)$ | $s_r = 1655 \times (3)$ |
| 0.2 | 0.584 | 0.342 | .00112 | 471 | 634 |
| 1 | 1 | 1 | .00327 | 1,375 | 1,855 |
| 5 | 1.710 | 2.924 | .00559 | 4,020 | 5,420 |
| 10 | 2.1544 | 4.6416 | .00705 | 6,400 | 8.600 |
| 30 | 3.1072 | 9.6549 | .01015 | 13,250 | 17,900 |
| 60 | 3.9149 | 15.380 | .01280 | 21,150 | 28,500 |
| 100 | 4.6416 | 21.60 | .01515 | 29,700 | 40,000 |
| 150 | 5.3133 | 28.35 | .01735 | 39,000 | 52,600 |
| 200 | 5.8480 | 34.40 | .01913 | 47,400 | 63,800 |

| (7) | (8) | (9) | (10) | (11) |
|---|---|---|---|---|
| $e = \frac{(5) - .3(6)}{18{,}500{,}000}$ | $b = .391 \times (7)$ | $y_1 = \frac{.1685}{(4)} \times (8)$ | $y_1 = (4) - (9)$ | $w_f = 5787 \times (10)$ |
| .0000152 | .0000059 | .000896 | .00022 | 1.274 |
| .0000443 | .0000173 | .000892 | .00235 | 13.78 |
| .0001295 | .0000506 | .001525 | .00407 | 23.60 |
| .0002065 | .0000807 | .001930 | .00512 | 29.65 |
| .0004255 | .0001664 | .002760 | .00739 | 42.80 |
| .0006810 | .0002660 | .003370 | .00943 | 54.65 |
| .0009570 | .0003740 | .004160 | .01099 | 63.60 |
| .001255 | .0004905 | .004760 | .01259 | 72.80 |
| .001528 | .0006000 | .005280 | .01385 | 80.20 |

| (12) | (13) | (14) | (15) | (16) |
|---|---|---|---|---|
| $w_c = (1) + (11)$ | $y_2 = .00000662 \times (12)$ | $y = (10) + (13)$ | $w_a = (12) + 14.7$ | T°—F Prop. |
| 1.474 | .00001 | .00023 | 16.17 | −38 |
| 14.78 | .00010 | .00248 | 29.48 | −13 |
| 28.60 | .00019 | .00426 | 43.30 | 7 |
| 39.65 | .000263 | .00535 | 54.35 | 20 |
| 72.80 | .000482 | .00787 | 87.50 | 47 |
| 114.65 | .000760 | .01019 | 129.30 | 74 |
| 163.60 | .00108 | .01207 | 178.30 | 96 |
| 222.80 | .00147 | .01406 | 237.50 | 118 |
| 280.20 | .00185 | .01570 | 294.90 | 137 |

Explanation of tabulated calculations

*Col. 1.*—Numbers in this column represent values of $w_m$, the uniform pressure, in p. s. i., which the diaphragm resists by membrane action, that is by pure tension, exclusive of flexural resistance. These values were arbitrarily assumed.

*Col. 2.*—Numbers in this column represent numbers in col. 1 raised to the one-third power. These numbers are needed for subsequent calculations.

*Col. 3.*—Numbers in this column represent number in col. 1 raised to the two-thirds power. These numbers also are needed for subsequent calculations.

*Col. 4.*—Numbers in this column represent $y_1'$, the deflection that the pressure $w_m$ in the first column would produce in a uniform diaphragm of radius $a = 0.5595$ in. and thickness $t = 0.007$ in., at a distance $b = 0.391$ from the center. The formula for this caluculation is $$y_1' = 0.662 a^{4/3} (w_m/Et)^{1/3} [1 - 0.9(b/a)^2 - 0.1(b/a)^5]$$

where $a$, $b$ and $w_m$ have the meanings already indicated, $E$ = modulus of elasticity, $t$ = diaphragm thickness. When the numerical values of these quantities are substitued the formula reduces to $y_1' = .00327\, w_m^{1/3}$, or $.00327 \times$ (col. 2). For authority, see the Hencky and the Stevens papers mentioned below. (The values of $y_1'$ in col. 4 must be corrected to take into account the constraint afforded by the thick central portion of the diaphragm. The effect of this central portion is to prevent any increase in the circumference at radius $b$, where the thin and thick portions join. Columns 5, 6, 7, 8 and 9 represent successive steps in the calculation of this correction).

Col. 5.—Numbers in col. 5 represent $s_c$, the circumferential unit stress at radius $b$. The formula for this stress is $$s_c = K \times \tfrac{1}{4}(E w_m^2 a^2/t^2)^{1/3}$$

where K is a coefficient depending on the ratio $b/a$ and having for the present ratio ($b/a=0.7$) a value of 1.12. On substitution of the numerical values of K, E, $a$ and $t$, the formula reduces to $$s_c = 1375 w_m^{2/3}, \text{ or } 1375 \times \text{col. 3}$$

(Fig. 8, which is copied from the Stevens paper identified below, shows how K varies with $b/a$).

Col. 6.—Numbers in col. 6 represent $s_r$, the radial unit stress at radius $b$. The formula for this stress is identical with that for $s_c$ except that the coefficient has a different value, being 1.51 for the present value of $b/a$. The formula reduces to $$s_r = 1855 w_m^{2/3}, \text{ or } 1855 \times \text{col. 3}$$

Col. 7.—Numbers in col. 7 represents $e$, the unit strain or deformation in the circumferential direction at radius $b$. It is equal to $$e = s_c/E - \nu s_r/E, \text{ or, taking } \nu=0.3, \; e=(s_c-0.3 s_r)/E$$

Col. 8.—Numbers in col. 8 represent $\Delta b$, the increase in the radius $b$ corresponding to a unit circumferential strain $e$. Since the radius increases in the same proportion as the circumference, $\Delta b = b \times e$, or $0.391 \times$ col. 7.

Col. 9.—Numbers in col. 9 represent the reduction in $y_1'$ that would be caused by pulling the inner edge of the thin part of the diaphragm upward and inward, rotating it about the outer edge, until it regained its original radius, as indicated in Fig. 9. The effect of the thick portion of the diaphragm is found by assuming that first the diaphragm deflects as though of uniform thickness $t=0.007$, and then is pulled back to where it would really be held all the time by the thick portion. To a close order of approximation, the reduction in $y_1$ is the same as though the inner edge D of the thin part swung up along the straight line DD', perpendicular to OD, instead of along an arc centered at O. Therefore the correction $$\Delta y_1 = \Delta b \times \tan\theta = \Delta b \times (a-b)/y_1' = \text{col. } 8 \times (0.1685/\text{col. } 4)$$

Col. 10.—Numbers in col. 10 represent the corrected value of $y_1$, found by subtracting col. 9 from col. 4.

Col. 11.—The pressure $w_m$ in col. 1 would cause the deflection $y_1$ in col. 10 only if there were no flexural stiffness whatever in the diaphragm. Actually there is considerable flexural stiffness, and because of this fact it would require an additional pressure $w_f$ to produce $y_1$. In other words, to produce a deflection $y_1$ the total pressure required is the sum of $w_m$, the pressure resisted by membrane action, and $w_f$, the pressure resisted by flexural action.

The relation between $y_1$ and $w_f$ is computed independently of $w_m$ and diaphragm action. The annular portion of the diaphragm (between radius $b$ and radius $a$) is regarded as a circular flat plate with a central hole, loaded uniformly over its actual surface with $w_f$, and uniformly along the inner perimeter with a total load equal to $W = w_f \times$ area of hole. The deflection due to $w_f$ is given by the formula $$y = \frac{3 w_f(m^2-1)}{16 m^2 E t^3}\left[a^4 + 3b^4 - 4a^2 b^2 \log\frac{a}{b} + \frac{16 a^2 b^4}{a^2-b^2}\left(\log\frac{a}{b}\right)^2\right]$$

For authority see the Roark publication mentioned below (Case 19).

The deflection due to W is given by the formula $$y = \frac{3W(m^2-1)}{4\pi M^2 E t^3}\left[a^2 - b^2 - \frac{4 a^2 b^2}{a^2-b^2}\left(\log\frac{a}{b}\right)^2\right]$$

For authority see the Roark publication (Case 20).

When the appropriate numerical values are substituted and W is replaced by $$w_f \times \pi \times 0.391^2 = 0.48 w_f$$

the first of the above expressions reduces to $y=0.0000601 w_f$, and the second to $y=0.0001127 w_f$, and adding it is found that the total deflection due to $w_f$ is $y_1 = 0.0001728 w_f$, and that therefore $w_f = 5787 y_1$.

Col. 12.—Numbers in col. 12 represent the actual gauge pressure $w_g = w_m + w_f$ required to produce the deflection $y_1$.

Col. 13.—Numbers in col. 13 represent $y_2$, the deflection of the center of the thick portion of the diaphragm relative to its edge. Although this thick portion is relatively rigid, its deflection, especially at higher pressures, is not negligible. The formula for computing this deflection is $$y_2 = \frac{3 w_g b^2 (m-1)(5m+1) a^2}{16 E m^2 t^3}$$

For authority see the Roark publication (Case 1).

when appropriate numerical values are substituted this becomes $$y_2 = 0.00000662 w_g$$

Col. 14.—Numbers in col. 14 represent the total deflection $y$ at the center of the diaphragm, found by adding $y_2$ from col. 13 to $y_1$ from col. 4.

Col. 15.—Numbers in col. 15 represent absolute pressure corresponding to gauge pressure in col. 14.

Col. 16.—Numbers in col. 16 represent the temperature, in degrees F., at which propane vapor develops the absolute pressure indicated in col. 15.

Temperature-deflection graph

The data obtained from the above calculations yield the temperature-deflection graph shown in Fig. 10. On the same figure is shown, by the dots, the experimental graph obtained on a sample diaphragm.

References

1. Hencky, H.: "Über den Spannungszustand in kreisrunden Platten mit verschwindender Biegungssteifigkeit," Zeits. Math. Phys., vol. 63, p. 311, 1915.

2. Stevens, H. H.: "Behavior of Circular Membranes Stretched above the Elastic Limit by Air Pressure," Experimental Stress Analysis, vol. II, No. 1, p. 139, 1944.

3. Roark, R. J.: "Formulas for Stress and Strain," 2nd ed., 1943.

What is claimed is:

A thermostatic unit comprising a substantially circular, homogeneous, integral, elastic-metal diaphragm rigidly supported at its periphery and subject on one face to the pressure of a saturated vapor which is subject to varying temperature, said diaphragm having a thick relatively inflexible substantially circular central portion bounded by plane parallel surfaces, and a thin relatively flexible flat annular surrounding portion lying between said plane surfaces and itself bounded by plane parallel surfaces, at least one of which is parallel with the first named surfaces, the thickness and the radial dimension of the thin annular portion being so coordinated that the total deflection at the center of the diaphragm is approximately proportional to the temperature of the saturated vapor, the thin annular portion having the effect of increasing the deflection rate in the lower deflection ranges to an extent which is a direct function of the thinness thereof, and the thicker portion exercising a restraining action on deflection which is low at low deflections but increases with deflection more rapidly than does deflection, the disparity of such increases being an inverse function of the radial dimension of the thin annular portion, said central portion being so proportioned as to flex within the useful pressure range sufficiently to contribute a significant component of said total deflection.

ADOLPH J. HILGERT.

REFERENCES CITED

The following references are of record in the file of this patent:

UNITED STATES PATENTS

| Number | Name | Date |
| --- | --- | --- |
| 441,855 | Sargent | Dec. 2, 1890 |
| 1,073,899 | Halsey | Sept. 23, 1913 |
| 1,819,987 | Hodge | Aug. 18, 1931 |

OTHER REFERENCES

Clifford: "Vapor Pressure-Temperature Curves," a one page chart, copyright 1940 by the Clifford Manufacturing Company, Boston.